United States Patent
Apfelbaum et al.

(10) Patent No.: US 9,779,050 B2
(45) Date of Patent: Oct. 3, 2017

(54) ALLOCATING VIRTUAL RESOURCES TO ROOT PCI BUS

(71) Applicant: Red Hat Israel, Ltd., Raanana (IL)

(72) Inventors: Marcel Apfelbaum, Raanana (IL); Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 231 days.

(21) Appl. No.: 14/697,213

(22) Filed: Apr. 27, 2015

(65) Prior Publication Data

US 2016/0314089 A1    Oct. 27, 2016

(51) Int. Cl.
*G06F 13/40* (2006.01)
*G06F 13/42* (2006.01)
*G06F 9/455* (2006.01)

(52) U.S. Cl.
CPC ...... *G06F 13/4027* (2013.01); *G06F 9/45558* (2013.01); *G06F 13/4221* (2013.01); *G06F 2009/45579* (2013.01)

(58) Field of Classification Search
CPC ................... G06F 9/45558; G06F 2009/45579
See application file for complete search history.

(56) References Cited

U.S. PATENT DOCUMENTS

| | | | |
|---|---|---|---|
| 7,213,094 B2 | 5/2007 | Edirisooriya et al. | |
| 7,334,071 B2 | 2/2008 | Onufryk et al. | |
| 8,359,415 B2 | 1/2013 | Brown et al. | |
| 8,521,941 B2 | 8/2013 | Regula | |
| 8,719,483 B2 | 5/2014 | Hidaka | |
| 8,745,238 B2 * | 6/2014 | Matthews | G06F 13/4081 709/226 |
| 8,838,867 B2 | 9/2014 | Daniel | |
| 2008/0288661 A1 * | 11/2008 | Galles | G06F 13/10 710/3 |
| 2008/0294808 A1 * | 11/2008 | Mahalingam | G06F 13/105 710/26 |

(Continued)

OTHER PUBLICATIONS

Apfelbaum, Marcel, "[PATCH 1/2] fw/pci: scan all buses if extraroots romfile is present", gmane.org, Nov. 24, 2014, 1 page http://article.gmane.org/gmane.comp.bios.coreboot.seabios/8423.

(Continued)

*Primary Examiner* — Glenn A Auve
(74) *Attorney, Agent, or Firm* — Lowenstein Sandler LLP (57) ABSTRACT

Systems and methods for allocating virtual resources to a root PCI bus. An example method may comprise: intercepting, by a hypervisor being executed by a processing device of a host computer system, a virtual machine read operation with respect to a certain address range within a Peripheral Component Interconnect (PCI) configuration space; presenting, to a virtual machine running on the host computer system, an identifier of a root PCI bus; presenting, to the virtual machine, a PCI-to-PCI bridge associated with the root PCI bus; presenting, to the virtual machine, a PCI device that is communicatively coupled to a secondary PCI bus, wherein the secondary PCI bus is communicatively coupled to the PCI-to-PCI bridge; receiving, from the virtual machine, an identifier of a resource pool associated with the PCI-to-PCI bridge; associating the resource pool with the root PCI bus; and notifying of the resource pool a guest operating system of the virtual machine.

20 Claims, 5 Drawing Sheets

(56) References Cited

U.S. PATENT DOCUMENTS

| | | | |
|---|---|---|---|
| 2011/0029693 A1 | 2/2011 | Brinkmann et al. | |
| 2012/0198446 A1* | 8/2012 | Sawa | G06F 9/45558 718/1 |
| 2015/0149996 A1* | 5/2015 | Tsirkin | G06F 9/45558 718/1 |
| 2015/0254203 A1* | 9/2015 | Higuchi | G06F 9/5011 710/314 |

OTHER PUBLICATIONS

Eshghi, K., et al., "SSD Architecture and PCI Express Interface", Chapter 2, Enterprise Computing Division, Integrated Device Technology, Inc., San Jose, CA 2013 pp. 19-45 http://www.springer.com/cda/content/document/cda_downloaddocument/9789400751453-c1.pdf.

Piotrowski, Adam et al., "PCIExpress Hot-Plug Mechanism in Linux-based ATCA Control Systems", International Journal of Microelectyronics and Computer Science, vol. 1, No. 2, 2010 pp. 201-204 http://journal.dmcs.p.lodz.pl/documents/10630/18076/JMCS_2_2010-14.pdf.

Pettey, Chris, "Multi-Root IOV", PCI-SIG,PCI-SIG Developers Conference, 2006, 33 pages https://www.pcisig.com/developers/main/training_materials/get_document?doc_id=53398ffee79a853f7562769f1ccd9b0f69eac368.

* cited by examiner

ALLOCATING VIRTUAL RESOURCES TO ROOT PCI BUS

TECHNICAL FIELD

The present disclosure is generally related to virtualized computer systems, and is more specifically related to systems and methods for allocating virtual resources to a root PCI bus.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for allocating virtual resources to a root Peripheral Component Interconnect (PCI) bus.

PCI bus is a parallel synchronized computer bus for attaching physical devices. Attached devices can take the form of an integrated circuit fitted onto the motherboard itself (called a planar device in the PCI specification) or an expansion card that fits into a slot installed on the motherboard. Examples of PCI cards used in personal computers and servers include: network cards, sound cards, modems, USB ports, TV tuner cards and disk controllers.

The PCI specification provides separate memory and I/O port address spaces for the devices connected to the bus. A third address space, called PCI Configuration Space, includes memory-mapped device registers that may be used by the firmware (such as PCI BIOS) to query the device attributes, such as the device type, device identifier, and specifications of the system resources to be assigned to the device. In certain implementations, at startup time, the firmware may query all PCI devices via PCI Configuration Space to identify the devices that are present and determine what system resources (memory space, I/O space, interrupt lines, etc.) each device needs. The firmware may then allocate the system resources and notify the operating system (OS) of the allocated resources (e.g., by modifying the corresponding entries of the Advanced Configuration and Power Interface (ACPI) table).

The PCI specification also supports device hot-plugging allowing a physical device to be attached to a PCI bus or removed from the system at any time during the system operation. Upon detecting a hot-plugged device, the firmware may query the device via the PCI Configuration Space and allocate the system resources to the device. Upon detecting a device removal, the firmware may release the system resources that were previously allocated by the device.

The PCI specification permits connecting multiple PCI buses by bus bridges to form a tree-like structure. A host/PCI bridge connects the host processor to the root PCI bus. All system resources allocated to the physical devices connected to the hierarchical PCI buses are comprised by a corresponding resource address range (e.g., memory address range and/or I/O port address range) that is associated with the root PCI bus. Thus, a given memory address or I/O port number is uniquely associated with a certain physical device and with the PCI bus sub-tree representing the path to that device.

For performing certain functions, such as system boot, a physical device should only be attached to a root PCI bus. Furthermore, NUMA nodes may only be attached to a root PCI bus because of the inherent architecture constraints and operating system limitations, and no more than one NUMA node may be attached to any given bus. While the PCI specification allows the presence of multiple root PCI buses in a computer system, such a multi-bus architecture would exhibit certain inherent limitations and/or deficiencies.

For example, hot-pluggable physical devices may only be supported by one root PCI bus only (usually, bus 0 as enumerated by the host/PCI bridge), but not by the extra root buses, since at the bus initialization time the firmware would not allocate to the extra root buses the system resources that may be later allocated to the hot-pluggable devices.

Aspects of the present disclosure address the above noted and other deficiencies by providing methods and systems for allocating virtual resources to a root PCI bus. In a virtualized environment, hot-plugging for extra root buses may be enabled by presenting to virtual machine one or more virtual PCI devices attached to a virtual PCI bus that is attached to a virtual PCI root bus via a PCI-to-PCI bridge, thus making the guest firmware efficiently allocate system resources to the virtual PCI root bus, as described in more details herein below.

In a virtualized environment, a host computer system may run a hypervisor that has full control of the processor and other platform hardware. A hypervisor presents a virtual machine with an abstraction of one or more virtual processors. A hypervisor is able to retain selective control of processor resources, physical memory, interrupt management, and input/output (I/O). Each virtual machine (VM) is a guest software environment that supports a stack consisting of operating system and application software. Each VM operates independently of other virtual machines and uses the hypervisor-provided interface to the processors, memory, storage, graphics, and I/O provided by a physical platform. The software executing in a virtual machine is executed at the reduced privilege level so that the hypervisor can retain control of platform resources, such as I/O ports and certain memory address ranges.

In accordance with one or more aspects of the present disclosure, the hypervisor may, by intercepting virtual machine memory read/write and/or input/output (I/O) operations with respect to certain memory and/or I/O port ranges within the PCI Configuration Space, present to virtual machine one or more virtual PCI devices attached to a virtual PCI bus that is connected to a virtual PCI root bus via a virtual PCI-to-PCI bridge, thus making the guest firmware efficiently allocate system resources to the virtual PCI root bus. "Guest firmware" herein refers to the executable code that is being executed in the context of a virtual machine to perform the functions of PCI BIOS.

In an illustrative example, the guest firmware may receive, from a hypervisor, identifiers of one or more root PCI buses. Alternatively, the guest firmware may scan the host/PCI bridge to identify all root PCI buses. The guest firmware may then scan each identified root PCI bus for PCI-to-PCI bridges. The hypervisor may intercept the virtual machine memory and/or I/O port read operations and present, to the virtual machine, a virtual PCI-to-PCI bridge associated with the virtual root PCI bus, and further present a secondary virtual PCI bus connected to the other side of the virtual PCI-to-PCI bridge.

Responsive to detecting the PCI-to-PCI bridge associated with the root PCI bus, the guest firmware may identify and scan the secondary PCI bus that is communicatively coupled to the other side of the PCI-to-PCI bridge. The hypervisor may intercept the virtual machine memory and/or I/O port read operations and present, to the virtual machine, one or more PCI devices connected to the secondary PCI bus.

For each PCI device detected, the guest firmware may add, to a resource pool (memory address range or I/O port number range) associated with the PCI-to-PCI bridge, the system resources allocated to the PCI device. The guest firmware may allocate the resources for multiple PCI devices attached to the secondary PCI bus using contiguous address ranges (e.g., memory address ranges or I/O port number ranges), thus optimizing the efficiency of system resource allocation. The guest firmware may further allocate certain resource address ranges to the PCI-to-PCI bridge itself, for later allocation to eventual hot-plugged PCI devices. The hypervisor may then associate the allocated pools of resources (e.g., memory address ranges and/or I/O port number ranges) with the root PCI bus and notify the guest OS (e.g., via modifying the corresponding entries of the Advanced Configuration and Power Interface (ACPI) table).

Later, when the guest OS detects hot-plugging of a new PCI device, the guest OS may allocate, to the new PCI device, system resources from the pre-allocated resource pools associated with the root PCI bus, as described in more details herein below.

Various aspects of the above referenced methods and systems are described in details herein below by way of examples, rather than by way of limitation.

Figure 1:
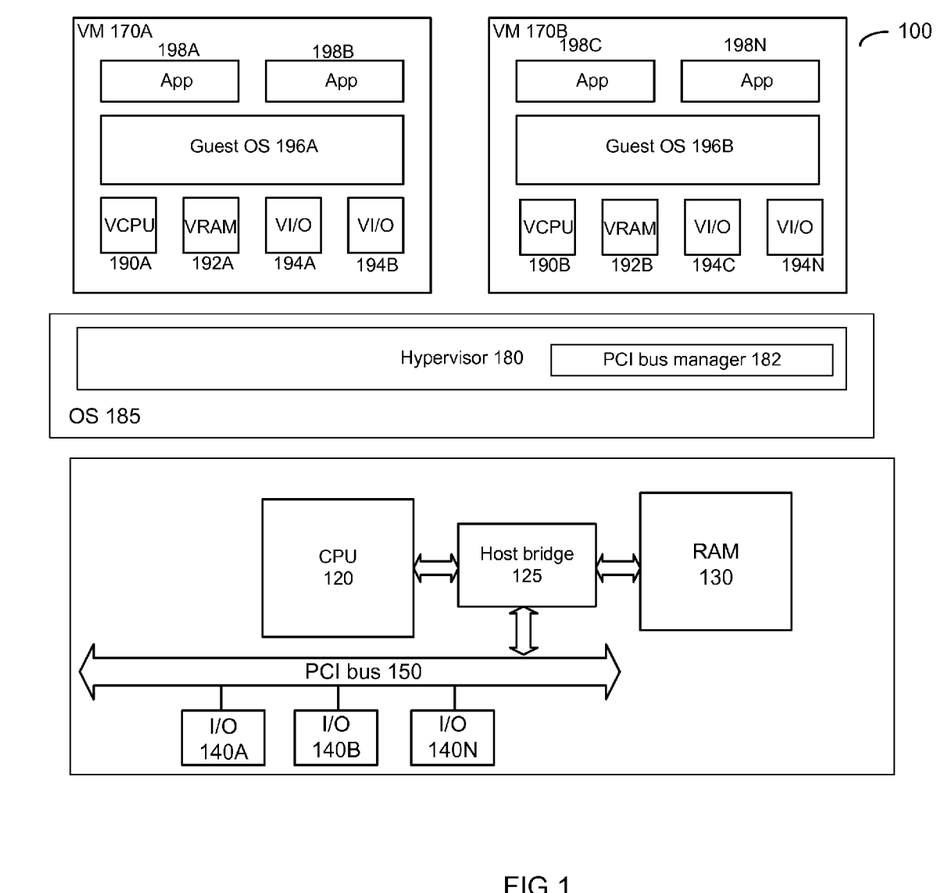
FIG. 1 depicts a high-level component diagram of an example computer system configured to implement the methods described herein, in accordance with one or more aspects of the present disclosure.

FIG. 1 depicts a high-level component diagram of an illustrative example of a computer system 100 in accordance with one or more aspects of the present disclosure. Computer system 100 may include one or more processors 120 communicatively coupled, via a host bridge 125, to system memory 130 and root PCI bus 150. Various I/O devices 140A-140N, such as network cards, sound cards, modems, USB ports, TV tuner cards and/or disk controllers, may be attached to PCI bus 150.

"Processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

Computer system 100 may run one or more virtual machines 170A-170B, by executing a software layer 180, often referred to as "hypervisor," above the hardware and below the virtual machines, as schematically illustrated by FIG. 1. In one illustrative example, hypervisor 180 may be a component of operating system 185 executed by host computer system 100. Alternatively, hypervisor 180 may be provided by an application running under host operating system 185, or may run directly on host computer system 100 without an operating system beneath it. Hypervisor 180 may abstract the physical layer, including processors, memory, and I/O devices, and present this abstraction to virtual machines 170A-170B as virtual devices. A virtual machine 170 may execute a guest operating system 196 which may utilize underlying virtual processors (also referred to as virtual central processing units (vCPUs)) 190, virtual memory 192, and virtual I/O devices 194A-194N. One or more applications 198A-198N may be running on a virtual machine 170 under guest operating system 196.

In various illustrative examples, processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses. Device virtualization may be implemented by intercepting virtual machine memory read/write and/or input/output (I/O) operations with respect to certain memory and/or I/O port ranges, and by routing hardware interrupts to a virtual machine associated with the corresponding virtual device.

In accordance with one or more aspects of the present disclosure, hypervisor 180 may include a PCI bus manager component 182 which may implement the allocation of virtual resources to root PCI buses, in accordance with one or more aspects of the present disclosure, as described in more details herein below with reference to FIGS. 2-3.

In certain implementations, PCI bus manager component 182 may be implemented as a software component invoked by hypervisor 180, and may comprise one or more code modules that implement method 300 described herein below and various auxiliary functions. Alternatively, functions of PCI bus manager component 182 may be performed by hypervisor 180.

Figure 2:
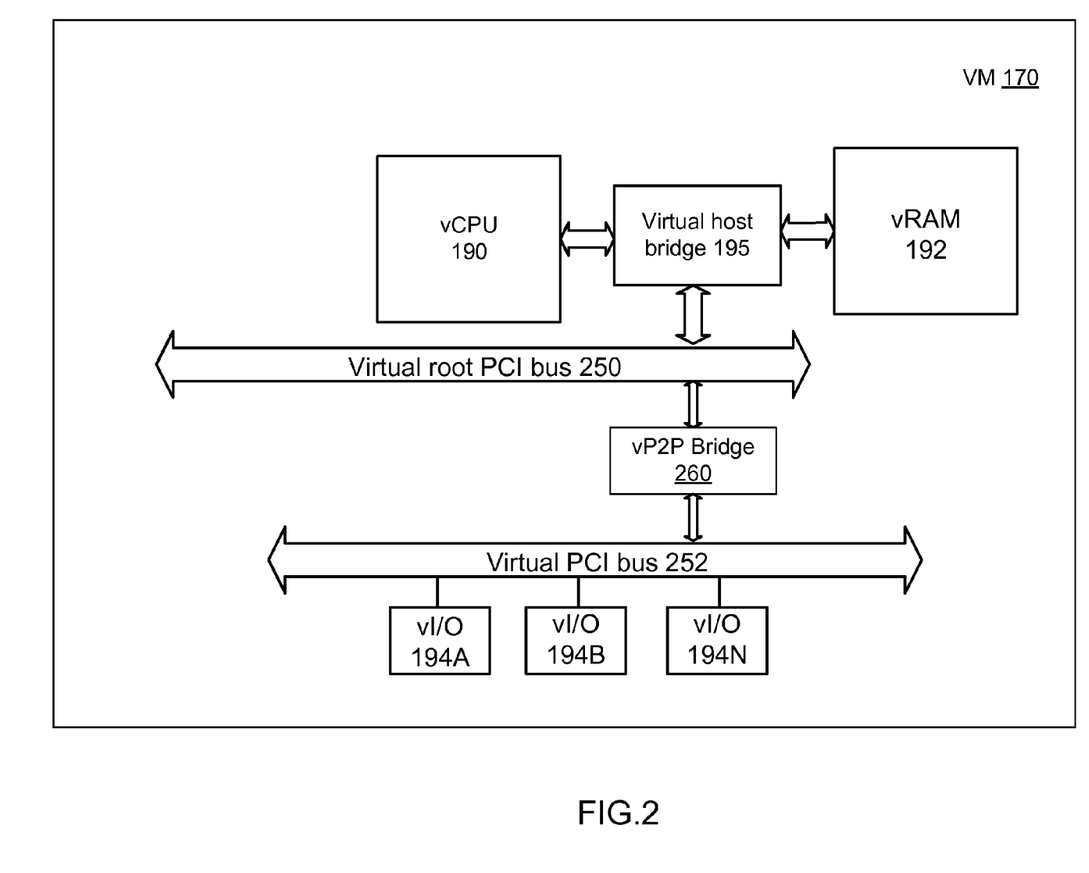
FIG. 2 schematically illustrates an example virtual machine operating in accordance with one or more aspects of the present disclosure.

FIG. 2 schematically illustrates an example virtual machine 170, in accordance with one or more aspects of the present disclosure. PCI bus manager component 182 of FIG. 1 may be programmed to intercept virtual machine 170 memory read/write and/or input/output (I/O) operations with respect to certain memory and/or I/O port ranges within the PCI Configuration Space, in order to present to virtual machine 170 one or more virtual PCI devices 194A-194N attached to virtual PCI root bus 250.

In an illustrative example, PCI bus manager component 182 may notify virtual machine 170 of the presence of virtual root PCI bus 250. PCI bus manager component 182 may further present to virtual machine 170, by intercepting virtual machine memory read/write and/or input/output (I/O) operations with respect to certain memory and/or I/O port ranges within the PCI Configuration Space, one or more PCI devices 194A-194N attached to virtual PCI bus 252, which is attached to virtual root PCI bus 250 via a virtual PCI-to-PCI bridge 260.

The guest firmware being executed by virtual machine 170 may, at the virtual machine startup, scan virtual root PCI bus 250B. PCI bus manager component 182 may intercept the virtual machine memory and/or I/O port read operations and present, to virtual machine 170, a virtual PCI-to-PCI bridge 260 associated with virtual root PCI bus 250, and further present a secondary virtual PCI bus 252 connected to the other side of virtual PCI-to-PCI bridge 260.

Responsive to detecting a PCI-to-PCI bridge 260 associated with root PCI bus 250B, the guest firmware may identify virtual PCI bus 252 that is communicatively coupled to the other side of PCI-to-PCI bridge 260. The guest firmware may then scan the identified virtual PCI bus 252. PCI bus manager component 182 may intercept the virtual machine memory and/or I/O port read operations and present, to virtual machine 170, one or more virtual PCI devices connected to virtual PCI bus 252.

The guest firmware may query all PCI devices via the PCI Configuration Space to identify the devices that are present and determine what system resources (memory space, I/O space, interrupt lines, etc.) each device needs. For each PCI device 194A-194N detected on virtual PCI bus 252, the guest firmware may add, to a resource pool (memory address range or I/O port number range) associated with PCI-to-PCI bridge 260, the system resources allocated to PCI device 194. The guest firmware may allocate the resources for multiple PCI devices attached to PCI bus 252 using contiguous address ranges (e.g., memory address ranges or I/O port number ranges), thus optimizing the efficiency of system resource allocation.

The guest firmware may further allocate certain resource address ranges to PCI-to-PCI bridge 260, for later allocation to eventual hot-plugged PCI devices. The hypervisor may then associate the allocated pools of resources (e.g., memory address ranges and/or I/O port number ranges) with root PCI bus 250B and notify the guest operating system by modifying the corresponding entries of a system configuration table. In certain implementations, the system configuration tables may conform to the Advanced Configuration and Power Interface (ACPI) Specification that defines an open standard for device configuration and power management functions by an operating system, including definitions of several system configuration tables.

Later, when the guest OS detects hot-plugging of a new PCI device to virtual PCI bus 252, the guest OS may allocate, to the new PCI device, system resources from the pre-allocated resource pools associated with root PCI bus 250B.

Figure 3A:
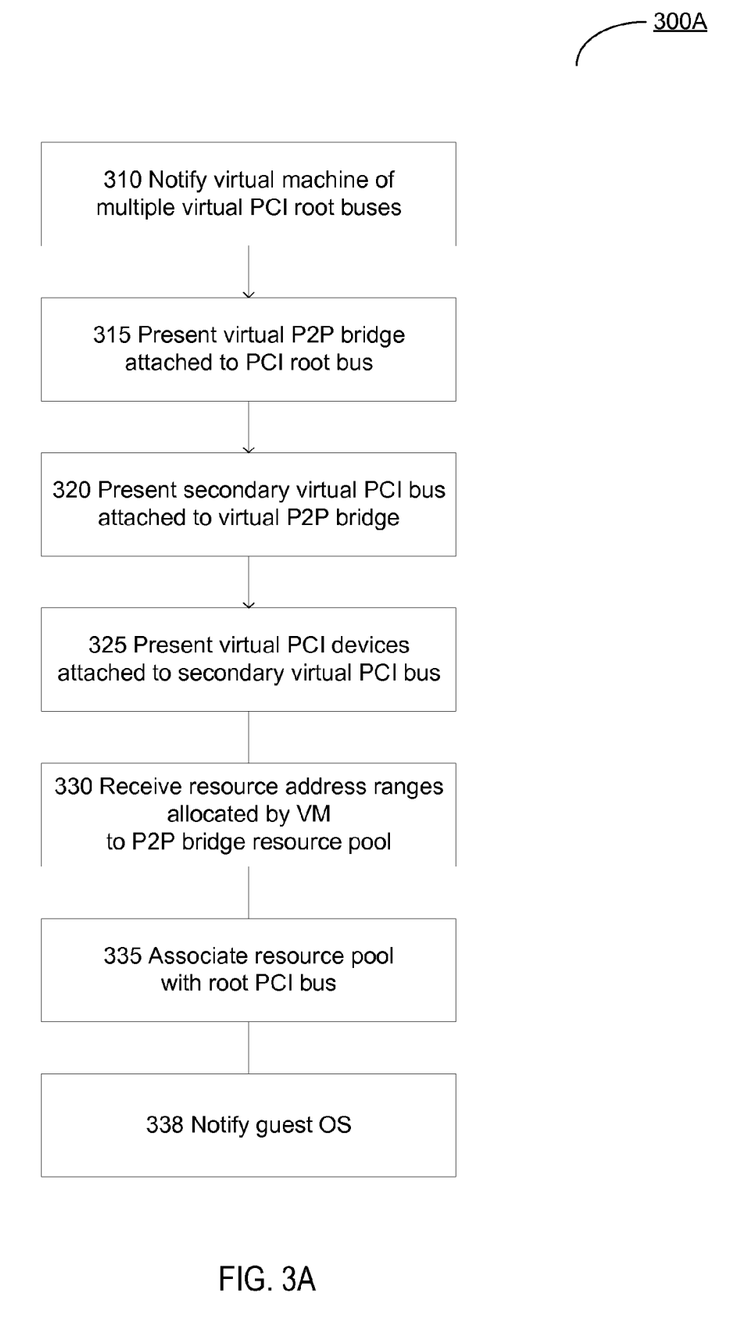
FIG. 3A depicts a flow diagram of a method for presenting virtual PCI devices to virtual machines by a hypervisor, in accordance with one or more aspects of the present disclosure.

FIG. 3A depicts a flow diagram of one illustrative example of a method 300A for presenting virtual PCI devices to virtual machines by a hypervisor, in accordance with one or more aspects of the present disclosure. Method 300A and/or each of its individual functions, routines, subroutines, or operations may be performed by one or more processing devices of the computer system (e.g., host computer system 100 of FIG. 1) implementing the method. In certain implementations, method 300A may be performed by a single processing thread. Alternatively, method 300A may be performed by two or more processing threads, each thread executing one or more individual functions, routines, subroutines, or operations of the method. In an illustrative example, the processing threads implementing method 300A may be synchronized (e.g., using semaphores, critical sections, and/or other thread synchronization mechanisms). Alternatively, the processing threads implementing method 300A may be executed asynchronously with respect to each other.

At block 310, a hypervisor being executed by a processing device of a host computer system implementing the method may, by intercepting virtual machine memory read/write and/or input/output (I/O) operations with respect to certain memory and/or I/O port ranges within the PCI Configuration Space, notify a virtual machine running on the host computer system of the presence of two or more virtual root PCI buses corresponding to two or more physical root PCI buses, as described in more details herein above.

At block 315, the hypervisor may, by intercepting virtual machine memory read/write and/or input/output (I/O) operations with respect to certain memory and/or I/O port ranges within the PCI Configuration Space, present to the virtual machine a virtual PCI-to-PCI bridge attached to the virtual PCI root bus, as described in more details herein above.

At block 320, the hypervisor may, by intercepting virtual machine memory read/write and/or input/output (I/O) operations with respect to certain memory and/or I/O port ranges within the PCI Configuration Space, present to the virtual machine a virtual secondary PCI bus attached the other side of the virtual PCI-to-PCI bridge, as described in more details herein above.

At block 325, the hypervisor may, by intercepting virtual machine memory read/write and/or input/output (I/O) operations with respect to certain memory and/or I/O port ranges within the PCI Configuration Space, present to the virtual machine one or more virtual PCI devices attached to the virtual PCI bus, corresponding to one or more physical PCI devices attached to a physical root PCI bus, as described in more details herein above.

At block 330, the hypervisor may receive, from the virtual machine, identifiers of one or more resource address ranges comprised by a resource pool associated with the PCI-to-PCI bridge, as described in more details herein above.

At block 335, the hypervisor may associate the resource pool with the root PCI bus.

At block 338, the hypervisor may notify the guest OS of the resource pool associated with the root PCI bus (e.g., by modifying the corresponding entries of the Advanced Configuration and Power Interface (ACPI) table), as described in more details herein above, and the method may terminate.

Figure 3B:
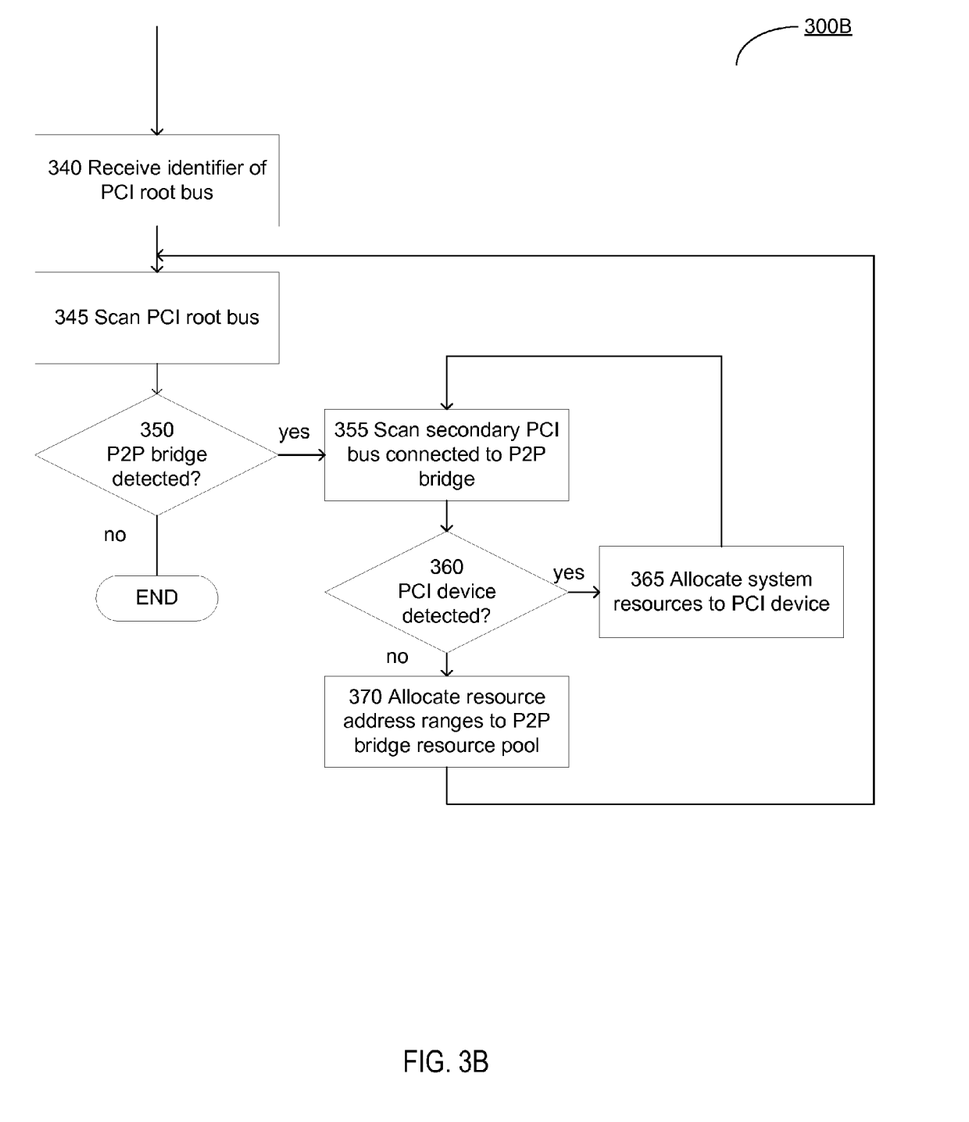
FIG. 3B depicts a flow diagram of a method for allocating virtual resources to a root PCI bus by the guest firmware, in accordance with one or more aspects of the present disclosure.

FIG. 3B depicts a flow diagram of one illustrative example of a method 300B for allocating virtual resources to a root PCI bus by guest firmware, in accordance with one or more aspects of the present disclosure. Method 300B and/or each of its individual functions, routines, subroutines, or operations may be performed by one or more processing devices of the computer system (e.g., host computer system 100 of FIG. 1) implementing the method. In certain implementations, method 300B may be performed by a single processing thread. Alternatively, method 300B may be performed by two or more processing threads, each thread executing one or more individual functions, routines, subroutines, or operations of the method. In an illustrative example, the processing threads implementing method 300B may be synchronized (e.g., using semaphores, critical sections, and/or other thread synchronization mechanisms). Alternatively, the processing threads implementing method 300B may be executed asynchronously with respect to each other.

At block 340, the firmware of a virtual machine ('guest firmware') being executed by a processing device of a host computer system implementing the method may receive, from the hypervisor, an identifier of a virtual root PCI bus.

At block 345, the guest firmware may scan a virtual root PCI bus (e.g., by reading certain registers within the PCI configuration space), as described in more details herein above.

Responsive to detecting, at block 350 a PCI-to-PCI bridge associated with the root PCI bus, the gust firmware may, at block 355, scan the secondary PCI bus which is connected to the other side of the bridge.

Responsive to discovering, at block 360, a PCI device connected to the secondary PCI bus, the guest firmware may, at block 365, allocate system resources (e.g., a memory range and/or an I/O port range) to the PCI device and associate the allocated system resources with the resource pool of the PCI-to-PCI bridge. The guest firmware may allocate the resources for multiple PCI devices attached to PCI bus 252 using contiguous address ranges (e.g., memory address ranges or I/O port number ranges), thus optimizing the efficiency of system resource allocation.

The guest firmware may repeat the bus scanning and resource allocation operations 355-365 until all PCI devices attached to the secondary PCI bus have been discovered, as described in more details herein above.

At block 370, the guest firmware may allocate certain resource address ranges to the resource pool of the PCI-to-PCI bridge, and the method may terminate.

Figure 4:
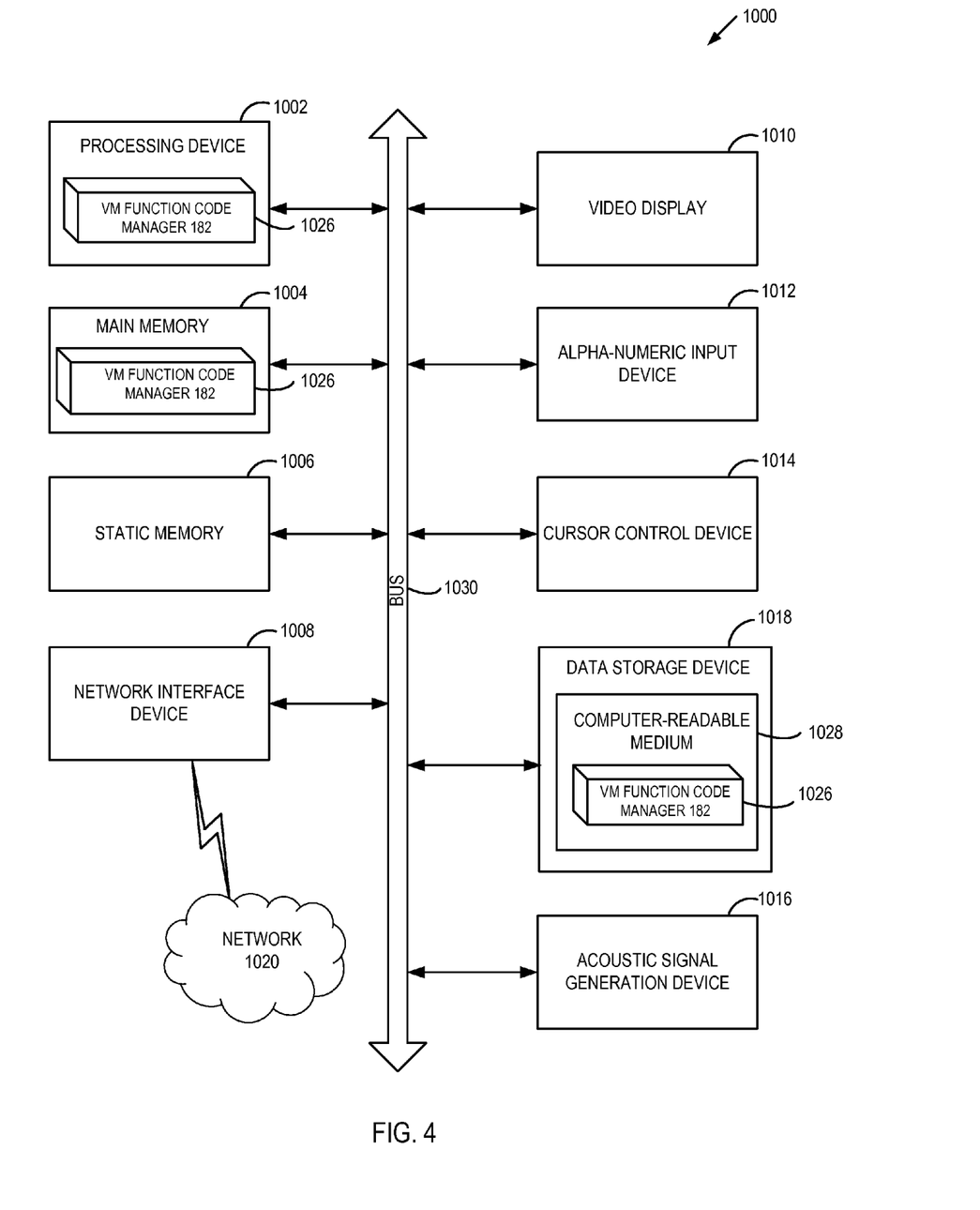
FIG. 4 depicts a block diagram of an example computer system operating in accordance with one or more aspects of the present disclosure.

FIG. 4 schematically illustrates a component diagram of an example computer system 1000 which can perform any one or more of the methods described herein. In various illustrative examples, computer system 1000 may represent host computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute PCI bus manager component 182 implementing method 300 for allocating virtual resources to a root PCI bus.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of PCI bus manager component 182 implementing method 300 for allocating virtual resources to a root PCI bus.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 4 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
    intercepting, by a hypervisor being executed by a processing device of a host computer system, a virtual machine read operation with respect to a certain address range within a Peripheral Component Interconnect (PCI) configuration space;
    presenting, to a virtual machine running on the host computer system, an identifier of a root PCI bus;
    presenting, to the virtual machine, a PCI-to-PCI bridge associated with the root PCI bus;
    presenting, to the virtual machine, a PCI device that is communicatively coupled to a secondary PCI bus, wherein the secondary PCI bus is communicatively coupled to the PCI-to-PCI bridge;
    receiving, from the virtual machine, identifiers of one or more resource address ranges comprised by a resource pool associated with the PCI-to-PCI bridge;
    associating the resource pool with the root PCI bus; and
    notifying a guest operating system of the virtual machine of the resource address ranges comprised by the resource pool.

2. The method of claim 1, wherein each resource address range of the one or more resource address ranges comprises at least one of: a memory address range or an input/output (I/O) port range.

3. The method of claim 1, wherein notifying the guest operating system of the resource address ranges comprised by the resource pool comprises creating an entry of a system configuration table.

4. The method of claim 3, wherein the system configuration table is provided by an Advanced Configuration and Power Interface (ACPI) table.

5. The method of claim 1, further comprising:
    detecting, by the virtual machine, hot-plugging of a new PCI device on the secondary PCI bus; and
    allocating, to the new PCI device, a resource address range of the resource pool associated with the root PCI bus.

6. The method of claim 1, wherein the resource pool comprises two or more PCI contiguous address ranges.

7. The method of claim 1, wherein the certain address range is represented by a memory address range.

8. The method of claim 1, wherein the certain address range is represented by an I/O address range.

9. A system, comprising:
    a physical Peripheral Component Interconnect (PCI) device communicatively coupled to a root PCI bus; and
    a processing device, communicatively coupled to the root PCI bus, to execute a hypervisor, the hypervisor to:
        present, to a virtual machine, a virtual PCI device communicatively coupled to a virtual root PCI bus via a virtual PCI-to-PCI bridge, wherein the virtual PCI device represents the physical PCI device and the virtual root PCI bus represents the root PCI bus; and allocate a resource address range to the virtual root PCI bus in view of a resource requirement of the virtual PCI device.

10. The system of claim 9, wherein the hypervisor is further to:
notify a guest operating system of resource address ranges comprised by a resource pool associated with the virtual root PCI bus.

11. The system of claim 10, wherein the virtual machine is further to:
detect hot-plugging of a new PCI device on a secondary PCI bus communicatively coupled to the PCI-to-PCI bridge; and
allocate, to the new PCI device, a resource address range of the resource pool associated with the root PCI bus.

12. The system of claim 9, wherein the virtual machine is to:
receive, by a guest firmware, an identifier of the virtual root PCI bus;
identify a virtual PCI device that is communicatively coupled to a secondary virtual PCI bus, wherein the secondary virtual PCI bus is communicatively coupled to the virtual PCI-to-PCI bridge; and
add, to a resource pool of the virtual PCI-to-PCI bridge, the resource address range allocated to the virtual PCI device.

13. The system of claim 9, wherein to present the virtual PCI device to the virtual machine, the hypervisor is to intercept virtual machine memory read operations with respect to a certain memory address range within a PCI Configuration Space.

14. The system of claim 9, wherein to present the virtual PCI device to the virtual machine, the hypervisor is to intercept virtual machine input/output (I/O) operations with respect to a certain I/O port range within a PCI Configuration Space.

15. A computer-readable non-transitory storage medium comprising executable instructions to cause a processing device to:
intercept, by a hypervisor being executed by the processing device, a virtual machine read operation with respect to a certain address range within a Peripheral Component Interconnect (PCI) configuration space;
present, to a virtual machine being executed by the processing device, an identifier of a root PCI bus;
present, to the virtual machine, a PCI-to-PCI bridge associated with the root PCI bus;
present, to the virtual machine, a PCI device that is communicatively coupled to a secondary PCI bus, wherein the secondary PCI bus is communicatively coupled to the PCI-to-PCI bridge;
receive, from the virtual machine, identifiers of one or more resource address ranges comprised by a resource pool associated with the PCI-to-PCI bridge;
associate the resource pool with the root PCI bus; and
notify a guest operating system of the virtual machine of the resource address ranges comprised by the resource pool.

16. The computer-readable non-transitory storage medium of claim 15, wherein each resource address range of the one or more resource address ranges comprises at least one of: a memory address range or an input/output (I/O) port range.

17. The computer-readable non-transitory storage medium of claim 15, wherein notifying the guest operating system of the resource address ranges comprised by the resource pool comprises creating an entry of a system configuration table.

18. The computer-readable non-transitory storage medium of claim 15, further comprising:
detecting, by the virtual machine, hot-plugging of a new PCI device on the secondary PCI bus; and
allocating, to the new PCI device, a resource address range of the resource pool associated with the root PCI bus.

19. The computer-readable non-transitory storage medium of claim 15, wherein the certain address range is represented by a memory address range.

20. The computer-readable non-transitory storage medium of claim 15, wherein the certain address range is represented by an I/O address range.

* * * * *